(No Model.)
H. C. ANDERSON.
CHURN MOTOR.
No. 405,336. Patented June 18, 1889.
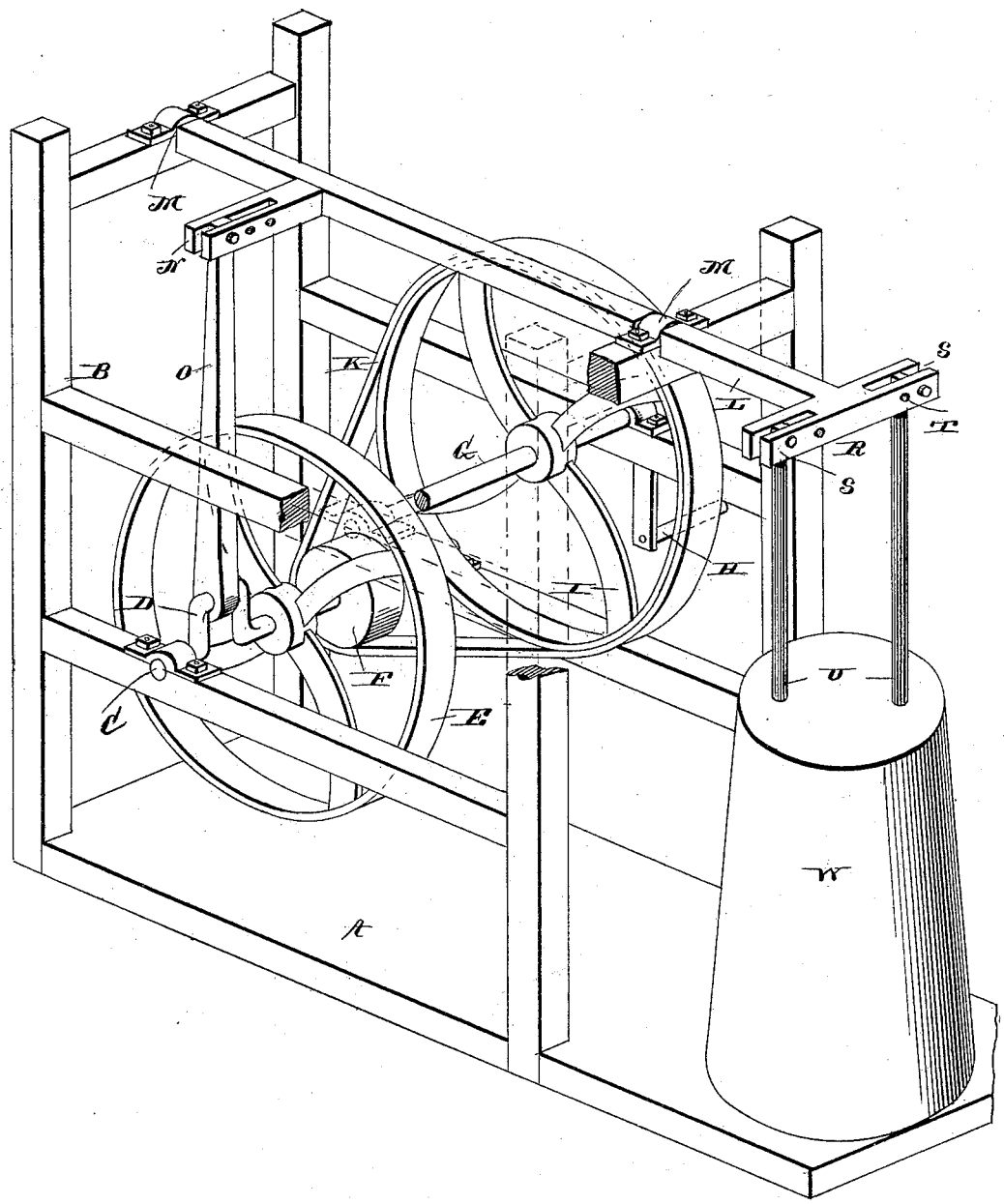
Witnesses.
John Imirie
J. W. Garner
Inventor
Henry C. Anderson
By his Attorneys

UNITED STATES PATENT OFFICE.

HENRY C. ANDERSON, OF WHITESBOROUGH, TEXAS, ASSIGNOR TO CHARLES C. CLEMENS AND JOHN B. CHOICE, OF SAME PLACE.

CHURN-MOTOR.

SPECIFICATION forming part of Letters Patent No. 405,336, dated June 18, 1889.

Application filed January 25, 1889. Serial No. 297,506. (No model.)

*To all whom it may concern:*

Be it known that I, HENRY C. ANDERSON, a citizen of the United States, residing at Whitesborough, in the county of Grayson and State of Texas, have invented a new and useful Improvement in Churn-Motors, of which the following is a specification.

My invention relates to an improvement in churn-motors; and it consists in the peculiar construction and combination of devices that will be more fully set forth hereinafter, and particularly pointed out in the claim.

The accompanying drawing is a perspective view of a churn-motor embodying my improvement.

A represents the base-board, from which rises a vertical rectangular frame B, of suitable construction. Journaled in bearings in the said frame is a transverse shaft C, which is provided with a crank D, and keyed to the said shaft is a fly-wheel E and a pulley F.

G represents a shaft, which is also journaled transversely in the frame, and is provided at one end with a crank H, by means of which the said shaft may be rotated by hand-power. Keyed to the shaft G is a large pulley I, which is connected to a small pulley F by means of an endless belt K. By this means, when the shaft G is rotated, accelerated rotary motion will be imparted to the shaft C.

L represents a rock-shaft, which is arranged longitudinally in the upper side of the frame, with one end projecting over one end of the base-board A, and said shaft is journaled in bearings M. An arm N projects from the rock-shaft and is connected to the crank D by means of a pitman O, as shown. To the projecting end of the rock-shaft is secured a cross-arm R, the ends of which are provided with pairs of projecting ears S, each of said ears having a series of transverse adjusting-openings T, adapted to receive bolts which serve to connect the upper ends of dasher-rods U to the cross-arm. The said dasher-rods are also provided with adjusting-openings, and may thereby be connected to the cross-arm at any desired point, according to the quantity of cream to be churned.

The churn-vessel W may be of ordinary or any preferred construction, and one or both of the dashers may be employed, as preferred.

The operation of my invention will be very readily understood. The pitman which connects the crank to the arm N of the rock-shaft causes the latter to oscillate very rapidly when the motor is in operation, and the cross-arm of the rock-shaft imparts rapid reciprocating motion to the dasher-rods; hence adapting the motor to churn cream into butter in a very short time and with comparative ease.

Having thus described my invention, I claim—

The combination of the frame, the rock-shaft arranged longitudinally in the top of the same and having the arm N and the cross-head R, the dasher-rods pivoted to the cross-head, the crank-shaft journaled transversely in the frame below the rock-shaft and having the fly-wheel E and the pulley F, the pitman connecting the crank-shaft and the arm N, the driving-shaft arranged transversely in the frame, the pulley I thereon, and the belt connecting the pulleys I and F, as set forth.

In testimony that I claim the foregoing as my own I have hereto affixed my signature in presence of two witnesses.

HENRY C. ANDERSON.

Witnesses:
A. J. CARTER,
W. A. DARNALL.